(12) United States Patent
Takimoto et al.

(10) Patent No.: US 8,483,554 B2
(45) Date of Patent: Jul. 9, 2013

(54) ELECTRONIC DEVICE AND IMAGING DEVICE

(75) Inventors: Aya Takimoto, Osaka (JP); Hirotsugu Matsuura, Osaka (JP); Yuji Tominaga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/281,382

(22) Filed: Oct. 25, 2011

(65) Prior Publication Data

US 2012/0243854 A1 Sep. 27, 2012

(30) Foreign Application Priority Data

Mar. 23, 2011 (JP) .................................. 2011-063830
Aug. 9, 2011 (JP) .................................. 2011-174222

(51) Int. Cl.
*G03B 17/08* (2006.01)
*G01M 3/04* (2006.01)

(52) U.S. Cl.
USPC ............................................. 396/27; 73/45.5

(58) Field of Classification Search
USPC .............................................. 396/27; 73/45.5
See application file for complete search history.

(56) References Cited

U.S. PATENT DOCUMENTS

| | | | | |
|---|---|---|---|---|
| 4,931,816 A | * | 6/1990 | Kamo et al. | 396/26 |
| 5,710,947 A | * | 1/1998 | Teremy et al. | 396/26 |
| 6,343,505 B1 | * | 2/2002 | Cook et al. | 73/114.39 |
| 6,384,322 B2 | | 5/2002 | Hirano | |
| 2004/0126105 A1 | * | 7/2004 | Dowe et al. | 396/277 |

FOREIGN PATENT DOCUMENTS

| | | |
|---|---|---|
| JP | 2001-244655 A | 9/2001 |
| JP | 2010-135429 A | 6/2010 |

* cited by examiner

*Primary Examiner* — Clayton E Laballe
*Assistant Examiner* — Noam Reisner
(74) *Attorney, Agent, or Firm* — Shinjyu Global IP

(57) ABSTRACT

An electronic device is provided that includes a housing, a waterproof air-permeable membrane, a door, an air pressure gauge and a watertightness detector. The housing defines an opening and includes an air vent. The waterproof air-permeable membrane blocks off the air vent. The door is shiftably coupled to the housing and movable between a first position that uncovers the opening and a second position that covers the opening. The door and the housing form a watertight structure when the door is in the second position. The air pressure gauge is disposed inside the watertight structure. The watertightness detector is configured to determine whether the housing and the door have maintained a watertight state based on changes in the air pressure inside the watertight structure when the door moves from the first to the second position. The changes in the air pressure are measured by the air pressure gauge.

17 Claims, 11 Drawing Sheets

ELECTRONIC DEVICE AND IMAGING DEVICE

CROSS-REFERENCE TO RELATED APPLICATIONS

This application claims priority under 35 U.S.C. §119 to Japanese Patent Application No. 2011-063830, filed on Mar. 23, 2011 and Japanese Patent Application No. 2011-174222, filed on Aug. 9, 2011. The entire disclosure of Japanese Patent Application No. 2011-063830 and Japanese Patent Application No. 2011-174222 are hereby incorporated herein by reference.

BACKGROUND

1. Technical Field

The technology disclosed herein relates to an electronic device and an imaging device equipped with an air pressure sensor.

2. Background Information

It is conventionally known in the art to test the watertightness (whether or not a watertight state is maintained) of a housing having a watertight structure. For instance, in Japanese Laid-Open Patent Application 2010-135429, a separate apparatus had to be connected in order to test the device in question.

SUMMARY

It has been discovered that the aforementioned conventional method for testing is difficult to apply while an ordinary user is using an electronic device.

Accordingly, one object of technology disclosed herein is to provide a device in which a testing for watertightness can be performed with a simple structure.

In accordance with one aspect of the technology disclosed herein, an electronic device is provided that includes a housing, a waterproof air-permeable membrane, a door, an air pressure gauge and a watertightness detector. The housing defines an opening and includes an air vent. The waterproof air-permeable membrane blocks off the air vent. The door is shiftably coupled to the housing and movable between a first position that uncovers the opening and a second position that covers the opening. The door and the housing form a watertight structure when the door is in the second position. The air pressure gauge is disposed inside the watertight structure. The watertightness detector is configured to determine whether the housing and the door have maintained a watertight state based on changes in the air pressure inside the watertight structure when the door moves from the first to the second position. The changes in the air pressure are measured by the air pressure gauge.

These and other features, aspects and advantages of the present invention will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

In the following embodiments, a digital camera will be used as an example in describing an imaging device. In the following description, using a digital camera in its landscape orientation as a reference, the subject side will be referred to as the "front," the opposite side from the subject as the "rear," the vertically upward part as "upper," the vertically downward part as "lower," the right side in a state of facing the subject head on as the "right," and the left side in a state of facing the subject head on as the "left." "Landscape orientation" is the orientation when the long-side direction of a captured image substantially coincides with the horizontal direction in the captured image.

Simplified Configuration of Digital Camera 1

Figure 1B:
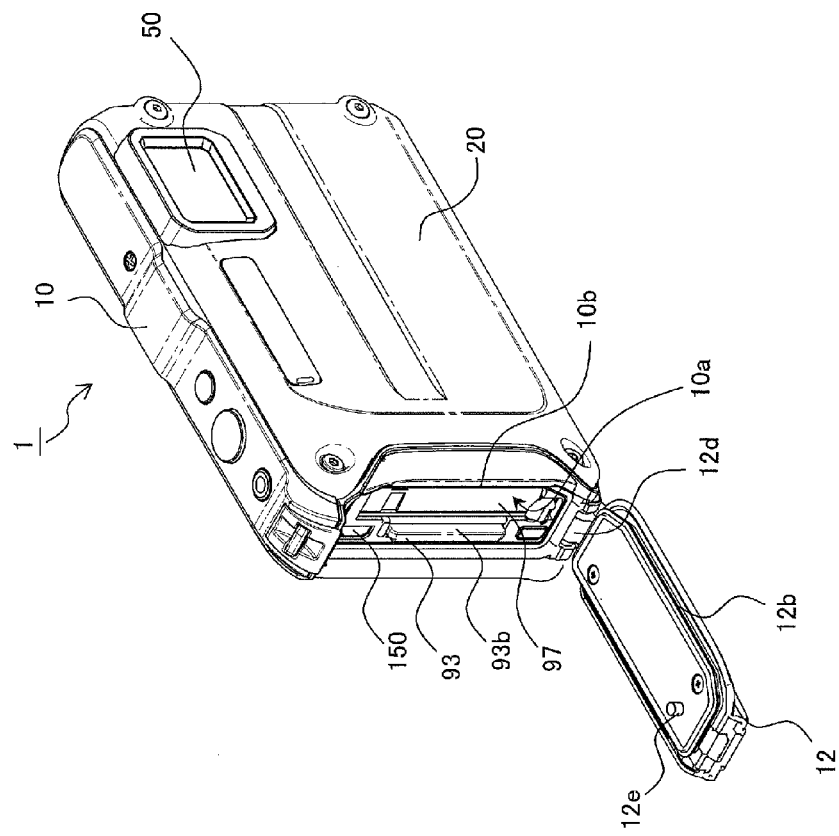
FIG. 1A and FIG. 1B are front oblique views of the digital camera 1 pertaining to an embodiment.
Figure 1A:
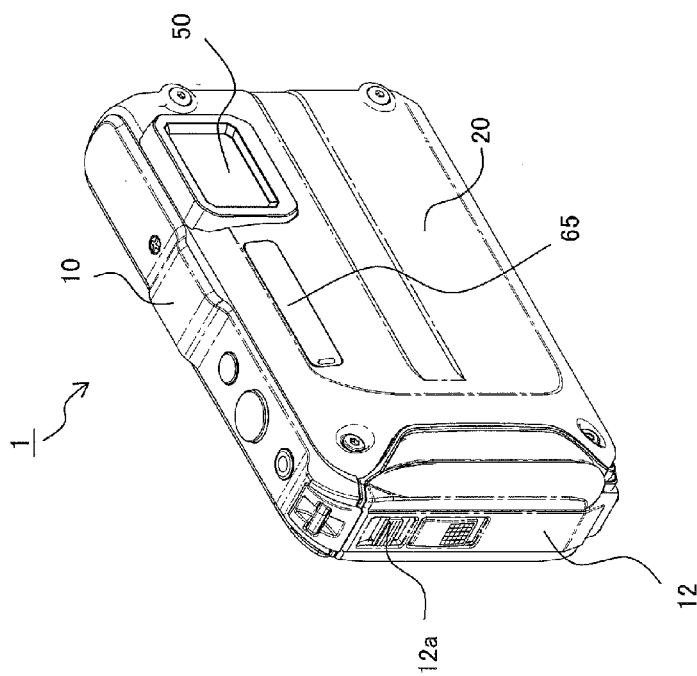
Figure 2:
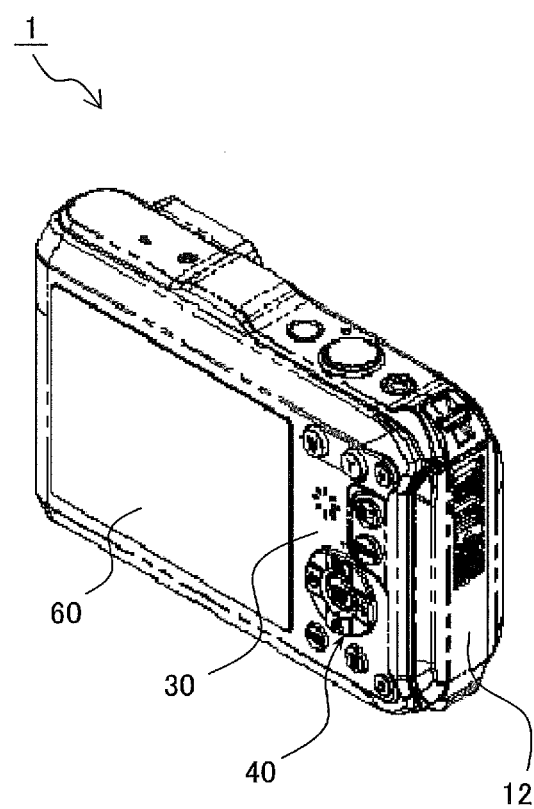
FIG. 2 is a rear oblique view of the digital camera 1 pertaining to an embodiment.

The simplified configuration of the digital camera 1 pertaining to the embodiment will be described through reference to the drawings. FIG. 1A and FIG. 1B are front oblique views of the digital camera 1 pertaining to the embodiment. FIG. 1A shows the state when the door 12 is closed, and FIG. 1B shows the state when the door 12 is open. FIG. 2 is a rear oblique view of the digital camera 1 pertaining to the embodiment.

The digital camera 1 comprises a housing 10, a door 12, a front cover 20, a rear cover 30, a manipulation unit 40, an optical system 50, a liquid crystal monitor 60, a flash 65, a card slot 93, and an open/closed detector switch 150.

The housing 10 is a holding vessel that constitutes a watertight structure along with the door 12. The housing 10 deforms under water pressure when immersed in water. Specifically, the amount of deformation of the housing 10 increases in proportion to the water depth. This housing 10 is preferably made of a material that is flexible and elastic. The housing 10 has an opening 10a and a frame 10b. The opening 10a is formed taller than it is wide on the side face of the housing 10. The frame 10b is formed so as to surround the opening 10a on the side face of the housing 10. The opening 10a is blocked off when the door 12 is snugly fitted to the frame 10b.

The door 12 can be opened by sliding an open/close switch 12a provided to the door 12 in the "open" direction during replacement of a memory card 93b, a battery 97, etc. The door 12 is connected to the housing 10 via a hinge 12d. The door 12 rotates with the hinge 12d as its rotational center, which allows it to transition between an "open" state of not covering the opening 10a and a "closed" state of covering the opening 10a. A gasket 12b is disposed surrounding the inner face of the door 12 and fits snugly against the frame 10b of the housing 10, which puts the housing 10 in a watertight state in the "closed" state. Thus, the door 12 is provided so that the opening 10a of the housing 10 can be opened and closed, and constitutes a watertight structure along with the housing 10 in its "closed" state of covering the opening 10a.

The card slot 93 is used to removably insert the memory card 93b. The battery 97 supplies power for operating the digital camera 1. The memory card 93b and the battery 97 are on the inside of the frame 10b, and can be removed when the door 12 is opened.

A protrusion 12e is disposed in the bounded region of the inner face of the door 12, the bounded region is bounded by the gasket 12b. The open/closed detector switch 150 is provided on the inside of the opening 10a surrounded by the frame 10b of the housing 10. The protrusion 12e is provided at a location where it will press on the open/closed detector switch 150 when the door 12 is closed. In this embodiment, the protrusion 12e and the open/closed detector switch 150 constitute a means for detecting whether the door is open or closed. When the door 12 is closed, the open/closed detector switch 150 is pressed by the protrusion 12e, that is, the open/closed detector switch 150 enters its ON state, and a controller 110 (discussed below) detects that the door 12 has been closed. When the door 12 is opened, the open/closed detector switch 150 enters its OFF state, and the controller 110 detects that the door 12 has been opened.

The front cover 20 is attached to the front face of the housing 10. The rear cover 30 is attached to the rear face of the housing 10. The operation unit 40 is attached to the rear face of the housing 10, and is exposed from the rear cover 30.

The operation unit 40 handles various inputs from the user. In this embodiment, the operation unit 40 handles the selection of the water depth measurement mode as one of the imaging modes. The optical system 50 is attached to the front face of the housing 10, and is exposed from the front cover 20. The optical system 50 lets external light into the interior of the housing 10 during imaging. The liquid crystal monitor 60 is attached to the rear face of the housing 10, and is exposed from the rear cover 30. Captured images are displayed on the liquid crystal monitor 60. The flash 65 is attached to the front face of the housing 10, and is exposed from the front cover 20.

Internal Configuration of Housing 10

Figure 3:
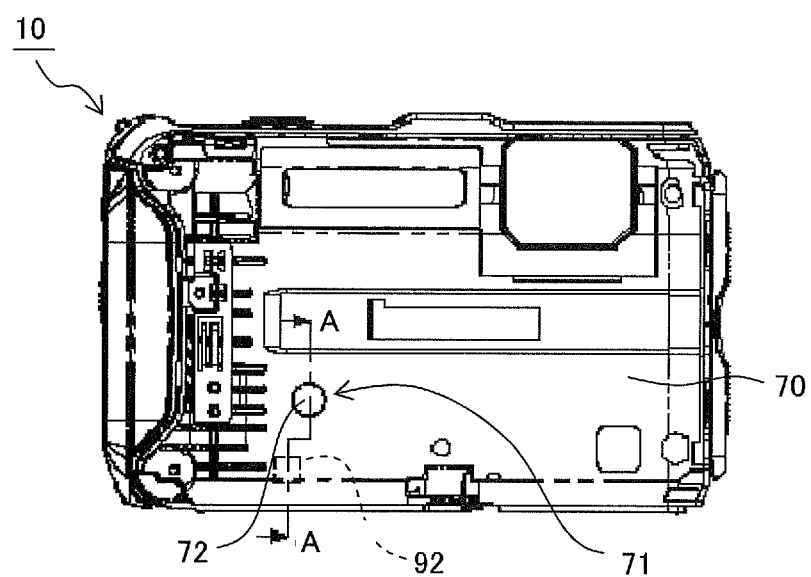
FIG. 3 is a front view of a housing 10 pertaining to an embodiment.
Figure 4:
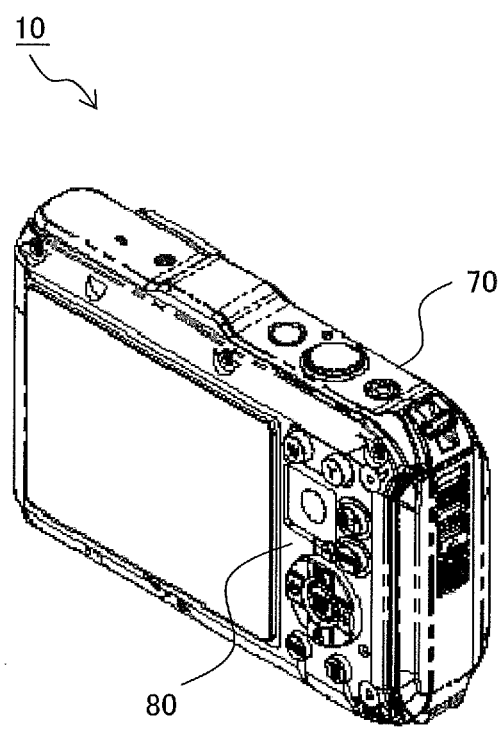
FIG. 4 is a rear oblique view of the housing 10 pertaining to an embodiment.
Figure 5:
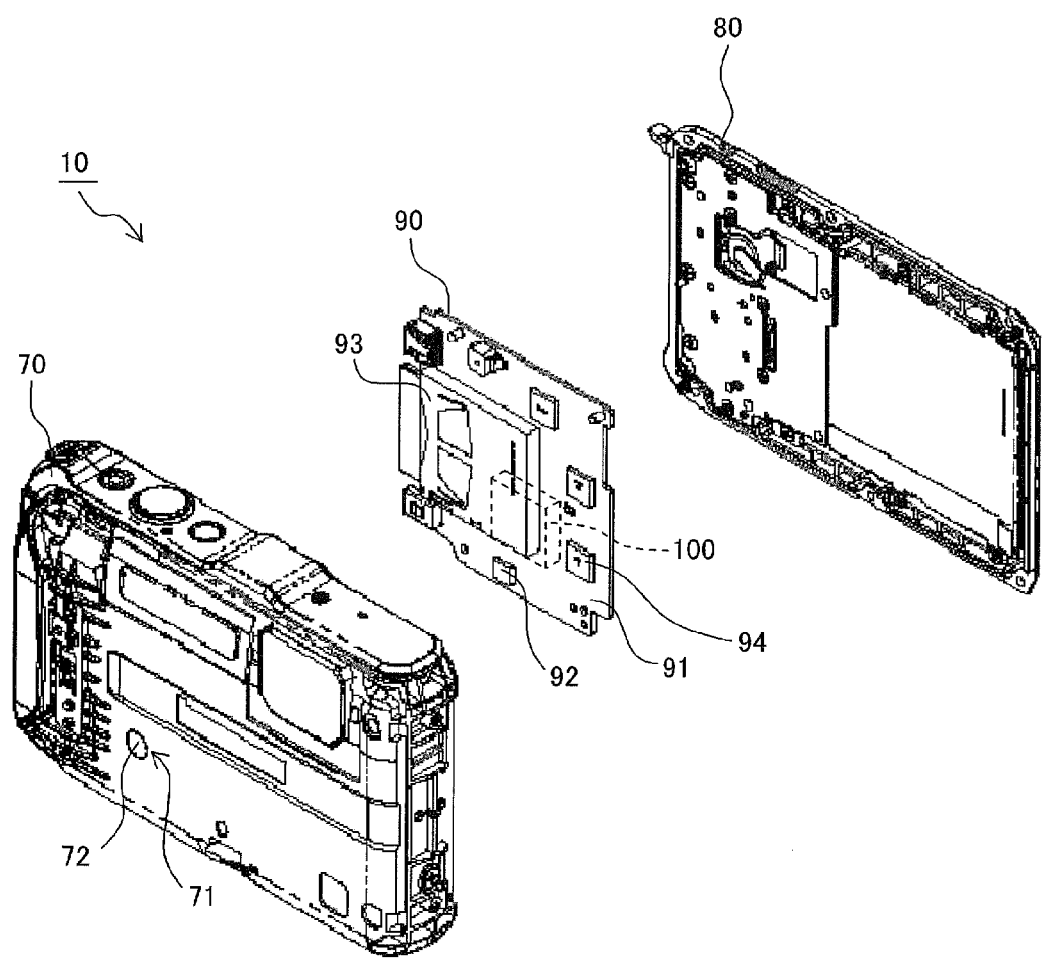
FIG. 5 is an exploded oblique view of the housing 10 pertaining to an embodiment.
Figure 6:
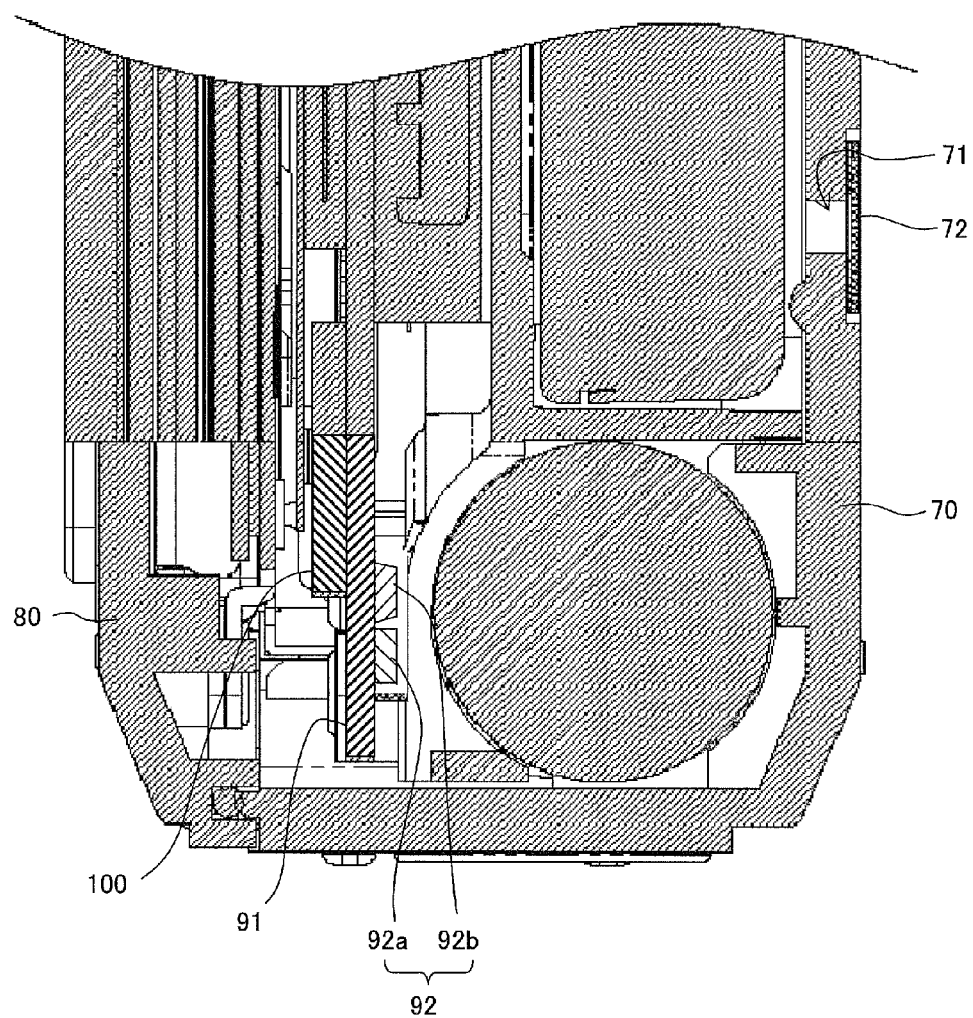
FIG. 6 is a cross section along the A-A line in FIG. 3.

FIG. 3 is a front view of the housing 10 pertaining to the embodiment. FIG. 4 is a rear oblique view of the housing 10 pertaining to the embodiment. FIG. 5 is an exploded oblique view of the housing pertaining to the embodiment. FIG. 6 is a cross section along the VI-VI line in FIG. 3. In FIGS. 3 and 4, the door 12 is attached to the housing 10.

The housing 10 is constituted by a front panel 70 and a rear panel 80, and a control board 90 is disposed in the interior of the housing 10. The front panel 70 and rear panel 80 are fitted snugly together in order to ensure the watertightness of the housing 10. Although not depicted in the drawings, a concave component constituting the opening 10a is formed on the right side face of each of the front panel 70 and rear panel 80. The control board 90 is sealed in between the front panel 70 and the rear panel 80.

The front panel 70 has an air vent 71 and a waterproof air-permeable membrane 72. The air vent 71 communicates between the inside and outside of the housing 10. The waterproof air-permeable membrane 72 blocks off the air vent 71.

The waterproof air-permeable membrane 72 is made from a material that is air-permeable. Accordingly, when the digital camera 1 is located in the air, the air pressure inside the housing 10 coincides with the atmospheric air pressure. Also, the waterproof air-permeable membrane 72 is made from a material that is waterproof. Accordingly, when the digital camera 1 is located in water, infiltration by water through the air vent 71 is suppressed. An example of a material that can be used for the waterproof air-permeable membrane 72 is Gore-Tex® made by W.L. Gore & Associates.

Figures 11A, 11B:
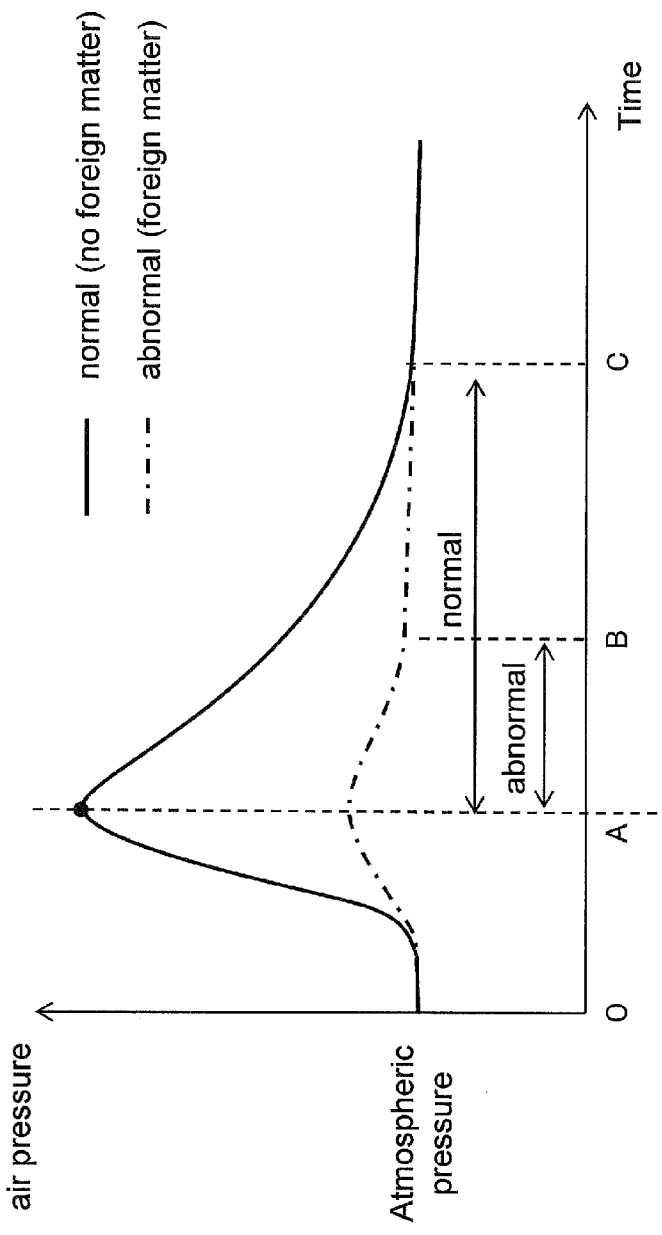
FIG. 11A and FIG. 11B are graphs of the relation between the open/closed state of a door 12 and the air pressure inside the housing 10.

The air pressure change inside the housing 10 will now be described through reference to the drawings. FIG. 11A and FIG. 11B show the relation between the open/closed state of the door 12 and the air pressure inside the housing 10. FIG. 11A is a graph of the change in air pressure inside the housing 10 when the door 12 has been closed from its open state. Time is plotted on the horizontal axis, and the air pressure inside the housing 10 on the vertical axis. The solid line indicates an example of the change in air pressure inside the housing 10 when the housing 10 maintains a watertight state. The one-dot chain line indicates an example of the change in air pressure inside the housing 10 when the housing 10 does not maintain a watertight state. FIG. 11B is a graph of the state of the open/closed detector switch 150. The open/closed detector switch 150 changes from OFF to ON at time A in synchronization with the timing at which the air pressure inside the housing 10 suddenly rises.

In this embodiment, a watertight state is maintained, and immediately after the door 12 is closed (the open/closed detector switch goes ON), there is a slight rise in the air pressure inside the housing 10 (time A). After this, air flows in and out through the waterproof air-permeable membrane 72. However, the flow of air through the waterproof air-permeable membrane 72 is less than when the watertight state is not being maintained with the door 12 closed, that is, when the gasket 12b and the frame 10b are not fitted snugly together. Accordingly, when a watertight state is maintained, the time it takes for the air pressure inside the housing 10 to equalize with atmospheric pressure after the door 12 has been closed is longer than when a watertight state is not being maintained (time C; in this embodiment, the elapsed time from time A is approximately 1 minute). However, if foreign matter clings to the gasket 12b of the door 12, for example, the gasket 12b and the frame 10b will not fit snugly together, and there will be a gap. Since air flows out through this gap, the watertightness inside the housing is lost and the rise in air pressure when the door 12 is closed is less than when a watertight state is maintained, and also the time it takes the air pressure inside the housing 10 to equalize with atmospheric pressure is shorter (time B; in this embodiment, the elapsed time from time A is approximately 2 seconds). The time it takes for the air pressure inside the housing 10 to equalize with atmospheric pressure is greatly affected by the size of the air vent 71 and the air permeability of the waterproof air-permeable membrane 72.

A waterproof tape (not shown) is attached between the front plate 70 and the optical system 50 and flash 65. A gasket (not shown) is attached between the rear plate 80 and the operation unit 40 and liquid crystal monitor 60.

The control board 90 has a board main body 91; a sensor unit 92, a card slot 93, and an AFE (analog front end) 94 installed on the front face of the board main body 91; and a system-on-a-chip 100 installed on the rear face of the board main body 91.

The board main body 91 is a flat member on which various electronic parts can be installed.

As shown in FIG. 6, the sensor unit 92 has an air pressure sensor 92a and a temperature sensor 92b. The air pressure sensor 92a detects the internal pressure inside the housing 10. When the digital camera 1 is located in the air, the detected air pressure value P detected by the air pressure sensor 92a is in agreement with atmosphere pressure. When the digital camera 1 is located under water, the detected air pressure value P detected by the air pressure sensor 92a rises in proportion to the water depth of the housing 10, that is, in proportion to the decrease in volume inside the housing 10. The temperature sensor 92b detects the temperature inside the housing 10.

The card slot 93 is used to removably insert a memory card. The AFE 94 subjects image data produced by a CCD image sensor 95 (one example of an "imaging means" discussed below) to noise suppression processing, processing for amplification of the input range width of an A/D converter, A/D conversion processing, and so forth.

The system-on-a-chip 100 provides overall control over the operation of the various electronic parts comprised by the digital camera 1. The configuration of the system-on-a-chip 100 will be discussed below.

Functional Configuration of Digital Camera 1

Figure 7:
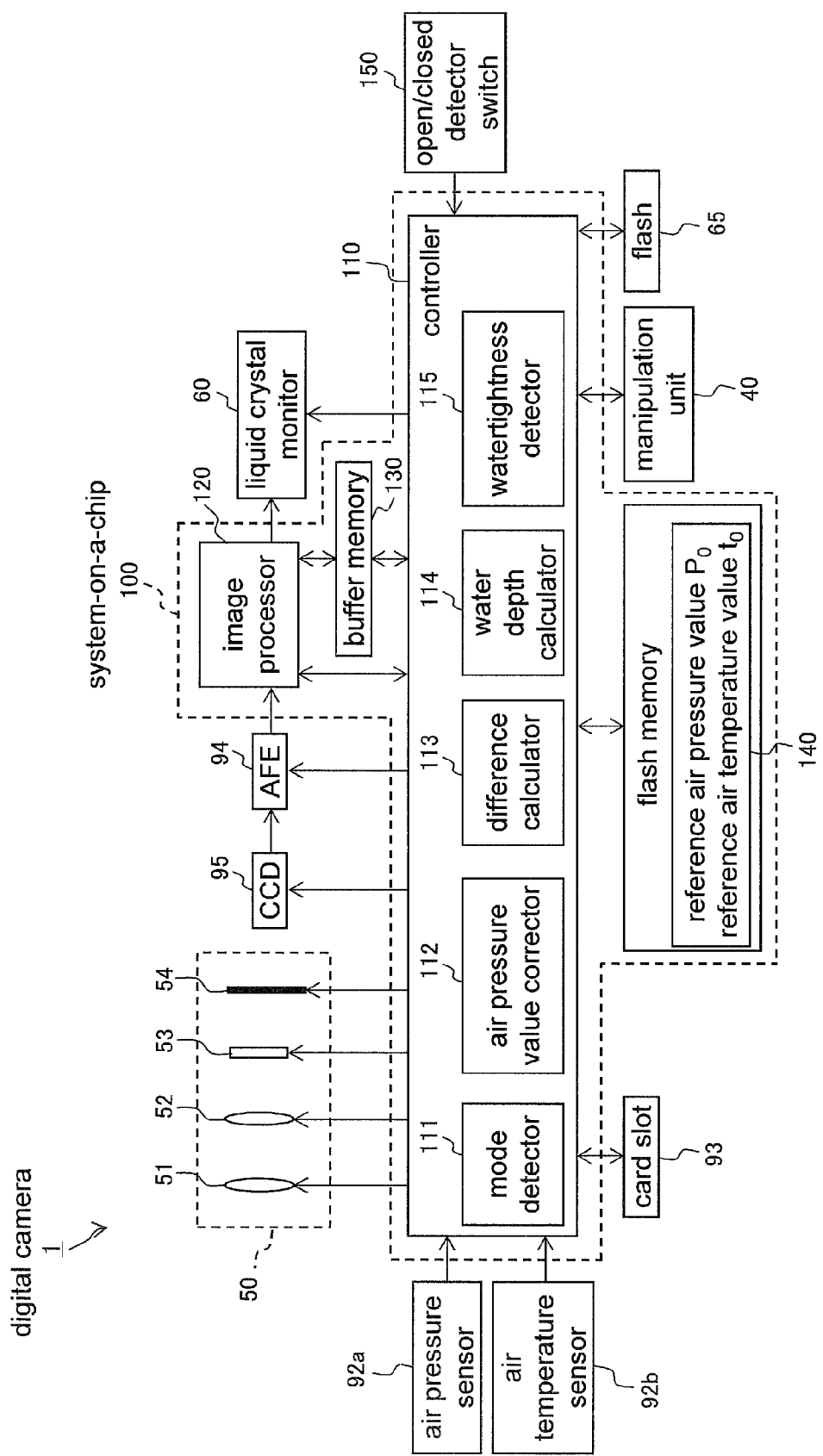
FIG. 7 is a function block diagram of the digital camera 1 pertaining to an embodiment.

FIG. 7 is a function block diagram showing the functional configuration of the digital camera 1 pertaining to the embodiment. In the following description, the configuration other than that discussed above will mainly be described.

The optical system 50 has a focus lens 51, a zoom lens 52, an aperture 53, and a shutter 54. The focus lens 51 adjusts the focus state of the subject. The zoom lens 52 adjusts the field angle of the subject. The aperture 53 adjusts the amount of light incident on the CCD image sensor 95. The shutter 54 adjust the exposure time of the light incident on the CCD image sensor 95. The focus lens 51, the zoom lens 52, the aperture 53, and the shutter 54 are each driven by a DC motor, a stepping motor, or another such drive unit according to a command signal send from a controller 110.

The CCD image sensor 95 is an example of the "imaging means" pertaining to the embodiment. The CCD image sensor 95 produces image data by opto-electrical conversion.

The system-on-a-chip 100 has the controller 110, an image processor 120, a buffer memory 130, and a flash memory 140.

The controller 110 provides overall control of the operation of the entire digital camera 1. The controller 110 is constituted by a ROM, a CPU, etc. The ROM contains programs for file control, autofocus control (AF control), automatic exposure control (AE control), and operational control over the flash 65, as well as programs for the overall control of the operation of the entire digital camera 1.

In this embodiment, the controller 110 has a mode detector 111, an air pressure value corrector 112, a differential calculator 113, and a water depth calculator 114 and a watertightness detector 115. If the user has selected water depth measurement mode with the manipulation unit 40, the controller 110 calculates the water depth D of the housing 10 on the basis of the air pressure P detected by an air pressure sensor 92a. The controller 110 here reads a reference air pressure value $P_0$ and a reference air temperature value $t_0$ from a flash memory 140. Also, if the controller 110 detects that the open/closed detector switch 150 is ON, that is, that the door 12 has transitioned from its open state to its closed state, then the watertightness detector 115 decides whether or not the housing 10 is in a watertight state. The functional configuration and operation of the controller 110 will be discussed below.

The controller 110 can also be constituted by a hard-wired electronic circuit or a microprocessor that executes programs.

The image processor 120 subjects the image data that has undergone various processing by the AFE 94 to white balance correction, color reproduction correction, gamma correction, smear correction, YC conversion processing, electronic zoom processing, and other such processing. In this embodiment, the image processor 120 subjects the image data to white balance correction, color reproduction correction, and gamma correction when the water depth value D of the housing 10 exceeds a specific water depth (such as about 3 meters). Here, the image processor 120 performs the white balance correction, color reproduction correction, and gamma correction so as to minimize an increase in blueness in the captured image (that is, a decrease in redness in the captured image).

The image processor 120 can also be constituted by a hard-wired electronic circuit or a microprocessor that executes programs.

The buffer memory 130 is a volatile storage medium that functions as a working memory for the controller 110 and the image processor 120. In this embodiment, the buffer memory 130 is a DRAM.

The flash memory 140 is an internal memory of the digital camera 1. The flash memory 140 is a non-volatile storage medium. In this embodiment, the reference air pressure value $P_0$ and reference air temperature value $t_0$ are stored in the flash memory 140.

Measuring Water Depth Value D from Detected Air Pressure Value P

The waterproof air-permeable membrane 72 blocks off the air hole 71 in the digital camera 1. When atmospheric pressure changes occur in the atmosphere, the internal pressure inside the housing 10 is changed in accordance with the atmospheric pressure due to the air permeability of the waterproof air-permeable membrane 72. Consequently, the air pressure inside the housing 10 is equal to the atmospheric pressure.

Then the digital camera 1 is gradually lowered in altitude and the air pressure inside the housing 10 becomes substantially equal to the atmospheric pressure at the altitude of the water surface just after the digital camera 1 drops under a water surface. After this, as the camera is submerged in the water, there is no change in the air pressure inside the housing 10, assuming the housing 10 is not deformed by water pressure. In actual practice, however, the housing 10 of the digital camera 1 is gradually deformed by the water pressure, which increases along with the water depth. This deformation is accompanied by a gradually rise in the air pressure inside the housing 10. The external water pressure (the water depth value D) can be estimated by measuring the air pressure change inside the housing 10. This is how the water depth value D is measured (estimated) with the digital camera 1 in this embodiment.

Specifically, air pressure change inside the housing 10 attributable to deformation of the housing 10 by water pressure is measured by the air pressure sensor 92a, and the water pressure (the water depth value D) can be estimated on the basis of this air pressure change. The relation between the air pressure change inside the housing 10 and the water pressure (the water depth value D) can be approximated by a specific nonlinear function (hereinafter referred to as a "water depth calculation function").

Functional Configuration of Controller 110

Figure 8:
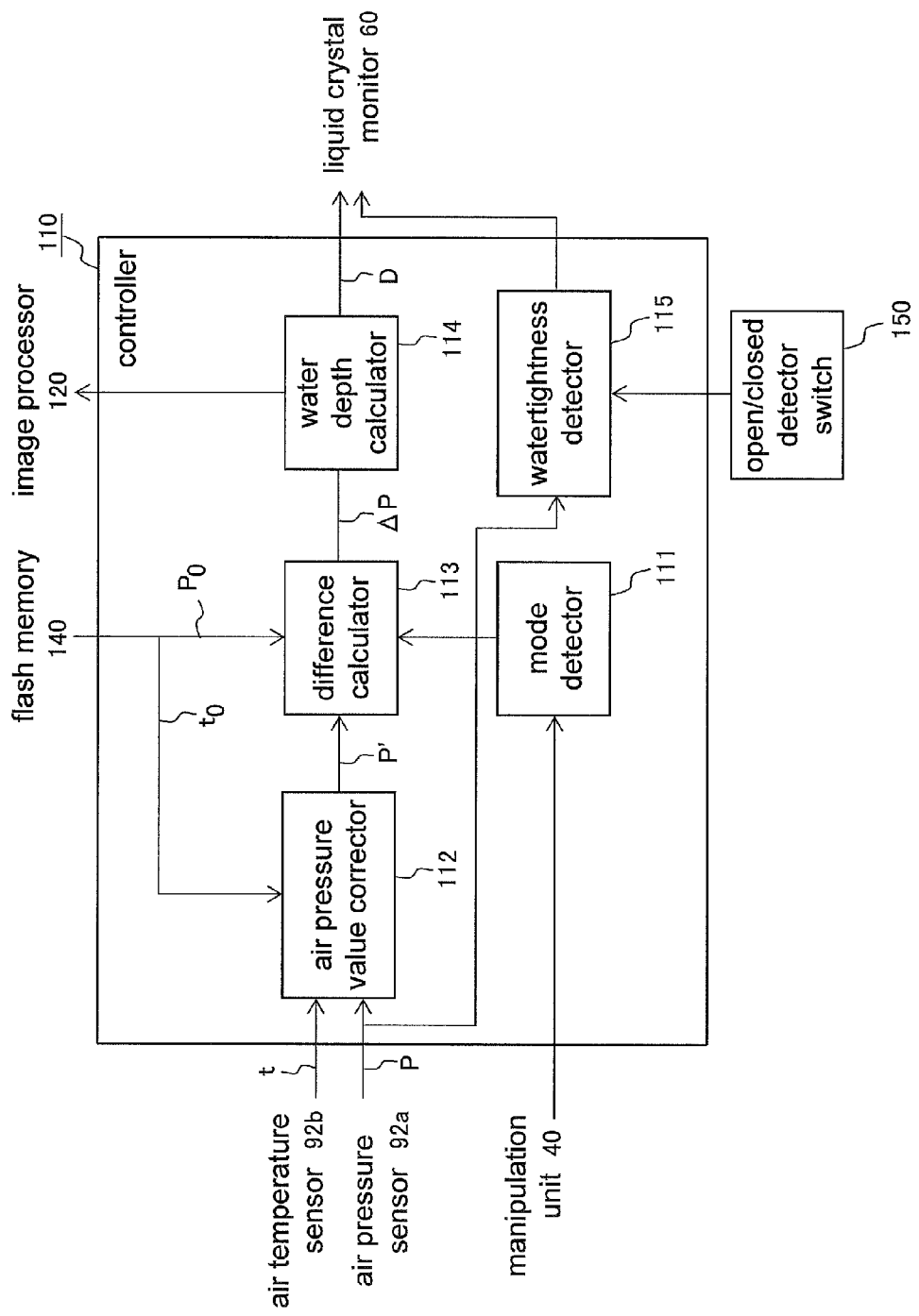
FIG. 8 is a function block diagram of a controller 110 pertaining to an embodiment.

FIG. 8 is a function block diagram of the functional configuration of the controller 110 pertaining to the embodiment.

The controller 110 has the mode detector 111, the air pressure value corrector 112, the differential calculator 113, and the water depth calculator 114 and the watertightness detector 115.

The mode detector 111 decides whether or not the camera is in water depth measurement mode. Setting and unsetting of the water depth measurement mode are performed with the operation unit 40. If the mode detector 111 decides that the camera is in water depth measurement mode, a notification to that effect is sent to the air pressure value corrector 112.

The air pressure value corrector 112 performs temperature correction on the detected air pressure value P detected by the air pressure sensor 92a on the basis of the reference air temperature value $t_0$ stored in the flash memory 140 and the detected temperature value t detected by the temperature sensor 92b. More specifically, the air pressure value corrector 112 calculates the corrected air pressure value P' from the following formula (I).

$$P' = P \times (273.2 + t_0) \div (273.2 + t) \quad (1)$$

The differential calculator 113 calculates the differential ΔP between the reference air pressure value $P_0$ stored it the flash memory 140 and the corrected air pressure value P' calculated by the air pressure value corrector 112. This differential ΔP is the relative amount of change in air pressure relative to the reference air pressure value $P_0$.

The water depth calculator 114 calculates the water depth value D on the basis of the differential ΔP found by a differential detector 102 and the water depth calculation function. The water depth calculator 114 displays the calculated water depth value D on the liquid crystal monitor 60. Also, the water depth calculator 114 notifies the image processor 120 when the calculated water depth value D exceeds the specific water depth (such as about 3 meters). The image processor 120 subjects the image data to white balance correction, color reproduction correction, and gamma correction according to the notification from the water depth calculator 114.

Upon detecting that the open/closed detector switch 150 is ON, that is, that the door 12 is in its closed state, the watertightness detector 115 decides whether or not the housing 10 is in a watertight state on the basis of the change in the air pressure value P detected by the air pressure sensor 92a. If it is decided that the housing 10 is not in a watertight state, a warning is displayed on the liquid crystal monitor 60.

Operation of System-on-a-Chip 100

Figure 9:
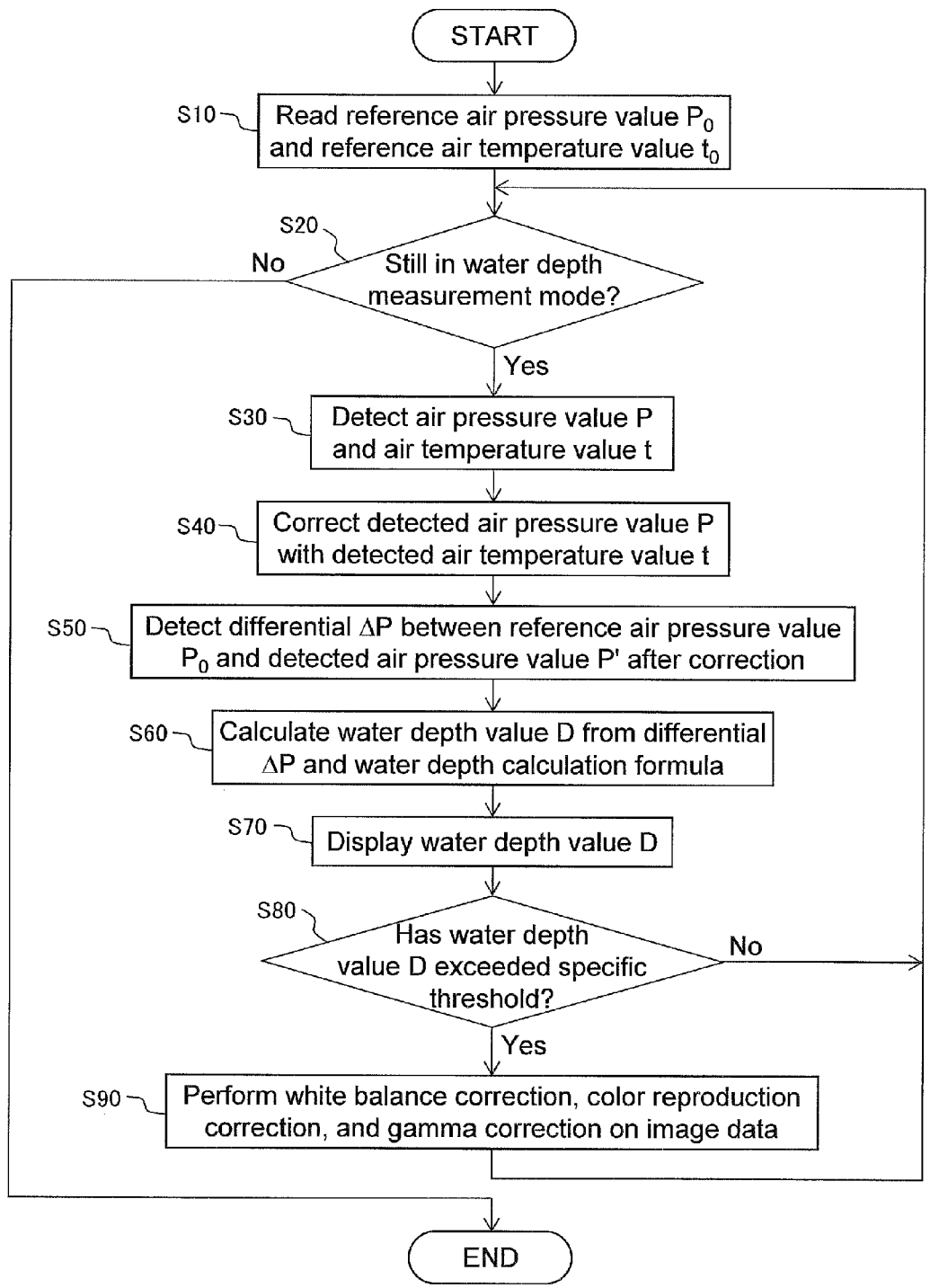
FIG. 9 is a flowchart illustrating the operation of a system-on-a-chip 100.

The operation of the system-on-a-chip 100 pertaining to the embodiment will be described through reference to the drawings. FIG. 9 is a flowchart illustrating the operation of the system-on-a-chip 100. In the following description, we will assume that the water depth measurement mode has been detected by the mode detector 111.

In step S10, the controller 110 reads the reference air pressure value $P_0$ and reference air temperature value $t_0$ stored in the flash memory 140.

In step S20, the controller 110 decides whether or not the water depth measurement mode is continuing. If the water depth measurement mode is continuing, the processing proceeds to step S30. If the water depth measurement mode has been switched off by the mode detector 111, the water depth measurement processing is ended.

In step S30, the controller 110 detects the detected air pressure value P outputted from the air pressure sensor 92a, and the detected temperature value t outputted from the temperature sensor 92b.

In step S40, the controller 110 finds the temperature-corrected air pressure value P' from the reference air temperature value $t_0$ read in step S10 and the detected air pressure value P and the detected temperature value t detected in step S30.

In step S50, the system-on-a-chip 100 calculates the differential ΔP between the reference air pressure value $P_0$ read in step S10 and the temperature-corrected air pressure value P' calculated in step S40.

In step S60, the controller 110 finds the water depth value D by using the water depth calculation function and the differential ΔP found in step S50.

In step S70, the controller 110 displays the water depth value D found in step S60 on the liquid crystal monitor 60.

In step S80, the controller 110 decides whether or not the water depth value D found in step S60 exceeds the specific water depth (such as about 3 meters). If the specific water depth is exceeded, the processing proceeds to step S90. If the specific water depth is not exceeded, the processing proceeds to step S20.

In step S90, the image processor 120 performs white balance correction, color reproduction correction, and gamma correction on the image data.

Operation of Watertightness Detector 115

Figure 10:
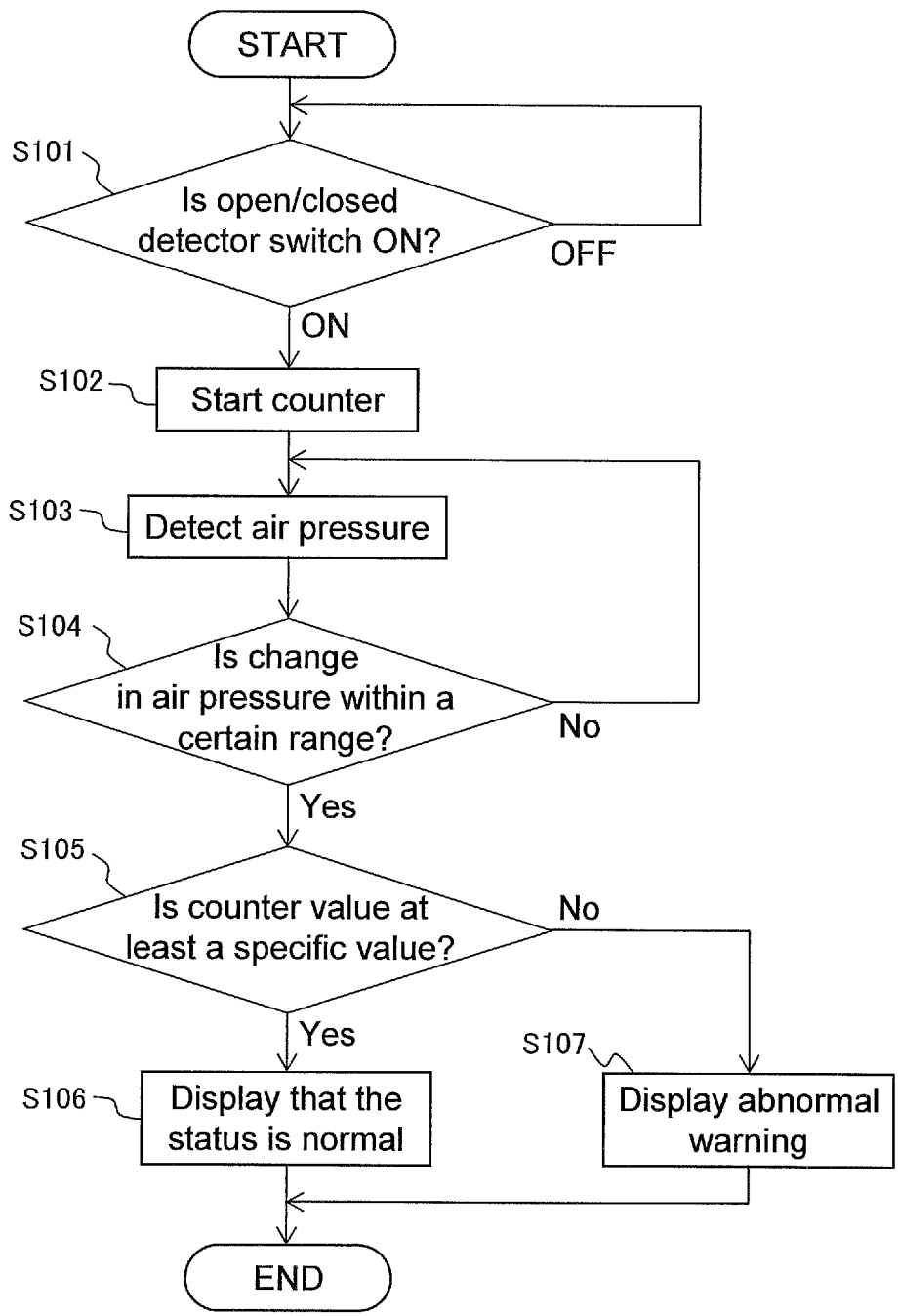
FIG. 10 is a flowchart illustrating the operation of a watertightness detector 115.

The operation of the watertightness detector 115 pertaining to this embodiment will be described through reference to the drawings. FIG. 10 is a flowchart illustrating the operation of the watertightness detector 115. The following description is of the operation in a state in which power has been switched on to the digital camera 1 and the door 12 is in its closed state, that is, a state in which "off" has been detected by the open/closed detector switch 150.

In step S101, the watertightness detector 115 decides whether the open/closed detector switch 150 is ON or OFF. If OFF, the state of the open/closed detector switch continues to be monitored. If ON, the flow moves to step S102.

In step S102, the watertightness detector 115 starts a counter.

In step S103, the watertightness detector begins sampling the air pressure value of the air pressure sensor 92a. More specifically, the air pressure value of the air pressure sensor 92a is acquired for each processing performed in step S103, and this is stored in the flash memory 140. The flash memory 140 stores the air pressure values acquired a specific number of times in the past (such as the last 10 times).

In step S104, an evaluation is made as to whether the change in the air pressure value is a specific value or lower on the basis of the air pressure values stored in step S103. In this embodiment, more specifically, the air pressure values acquired a certain number of times are compared, and if the change falls within a specific range that can be considered to be substantially no change, then the air pressure inside the housing and the air pressure outside are considered to be equal, and the flow moves to step S105. For example, the differences between two consecutively acquired air pressure values are found successively for the last ten air pressure values that have been acquired, and if the total value is below a specific threshold, the air pressure inside the housing can be considered equal to the air pressure outside. If the air pressure value is not within the specific range, the counter is increased by one, and the flow returns to step S103.

In step S105, the counter value is checked. If the counter value is at least a specific value, it is determined that a watertight state is being maintained, and the flow moves to step S106. If the counter value is less than the specific value, it is determined that foreign matter or the like has stuck to the door and the watertight state has been lost, and the flow moves to step S107.

In step S106, the watertightness detector 115 displays on the liquid crystal monitor 60 that the status is normal, and notifies the user that a watertight state is in effect. Furthermore, the watertightness detector 115 automatically starts the operation of watertightness testing by moving the open/closed detector switch from OFF to ON, regardless of the intention of the user. Therefore, if the status is normal, the processing of step S106 may be omitted.

In step S107, the watertightness detector 115 displays a warning on the liquid crystal monitor 60, and notifies the user that the housing is not in a watertight state.

EFFECTS OF THE INVENTION (1) The digital camera 1 pertaining to an embodiment comprises the housing 10 having the opening 10a and the air vent 71, the waterproof air-permeable membrane 72 provided so as to block off the air vent 71, the door 12 that constitutes a watertight structure along with the housing 10 by entering a closed state of covering the opening 10a, the air pressure sensor 92a provided inside the watertight structure, and the watertightness detector 115 that determines whether or not the housing 10 and the door 12 are maintaining a watertight state on the basis of the change in the air pressure within the watertight structure as measured by the air pressure sensor 92a.

Thus, whether or not the housing 10 and the door 12 are maintaining a watertight state is determined on the basis of the change in the air pressure within the watertight structure, so whether or not a watertight state is being maintained can be determined with just the digital camera 1. Also, an electronic device and imaging device can be provided with which a test for watertightness can be performed with a simple structure.

(2) The digital camera 1 pertaining to an embodiment comprises the open/closed detector switch 150 that detects that the door 12 is in a closed state and that the door 12 is in an open state (and not a closed state), and the watertightness detector 115 determines that a watertight state is not being maintained when the change in the air pressure measured by the air pressure sensor 92a drops below the specific value within a specific length of time after the open/closed detector switch 150 has detected that the door 12 has changed from its open state to its closed state.

Thus, whether or not the digital camera 1 is maintaining a watertight structure can be determined from whether or not there is a change (reduction) in the air pressure inside the housing 10 within a short time after the door 12 has been closed.

Other Embodiments

The present invention is described by the embodiment above, but this should not be interpreted to mean that the text and drawings that form part of this disclosure limit this invention. Various substitute embodiments, working examples, and implementation techniques will probably be obvious to a person skilled in the art from this disclosure.

(A) In the above embodiment, the controller 110 began calculation processing for the water depth value D when the user has selected the water depth measurement mode, but this is not the only option. The calculation of the water depth value D may be begun when entry of the housing 10 into water has been detected if the digital camera 1 comprises a water entry detector for detecting the entry of the housing 10 into water. In this case, since entry into water can be detected automatically, the water depth value D can be measured more accurately than when the calculation processing for the water depth value D is begun in response to operation by the user. Furthermore, the controller 110 may have a water entry detector that detects the entry of the housing 10 into water in response to a change in voltage between a pair of electrodes provided on the outer surface of the housing 10.

(B) In the above embodiment, the controller 110 used specific values stored in the flash memory 140 as the reference air pressure value $P_0$ and the reference air temperature value $t_0$, but this is not the only option.

For example, the controller 110 may use as the reference air pressure value $P_0$ the detected air pressure value P when selection of the water depth measurement mode has been detected. In this case, the water depth value D can be calculated by referring to how high the atmospheric pressure is at the point when calculation processing is started for the water depth value D. Accordingly, the water depth value D can be calculated more accurately.

Also, the controller 110 may use as the reference air pressure value $P_0$ the detected air pressure value P when entry of the housing 10 into water has been detected by the above-mentioned water entry detector. In this case, the detected air pressure value P at the point of water entry can be used as a reference, so the water depth value D can be calculated more accurately.

Furthermore, the controller 110 may use as the reference air pressure value $P_0$ the detected air pressure value P at a point in time designated by the user. In this case, the point of water entry can be accurately ascertained even if the above-mentioned water entry detector is not provided, so the water depth value D can be calculated more accurately.

(C) In the above embodiment, the image processor 120 performed white balance correction, color reproduction correction, and gamma correction when the water depth value D exceeded the specific water depth, but this is not the only option. For example, the image processor 120 may gradually increase the strength of the white balance correction, color reproduction correction, and gamma correction as the water depth value D becomes larger. In this case, since the correction strength can be altered according to the water depth value D, the quality of a captured image can be further improved.

Also, the image processor 120 may perform just one correction from among white balance correction, color reproduction correction, and gamma correction in order to minimize the increase in blueness of the captured image.

(D) In the above embodiment, the water depth calculator 114 calculated by the water depth value D, but this is not the only option. The water depth calculator 114 may calculate a "water pressure value" instead of the water depth value D. This "water pressure value" can be calculated from the water depth calculation function described in the above embodiment, or a similar function.

(E) In the above embodiment, the digital camera 1 (an example of an "imaging device") was given as an example of an "electronic device," but this is not the only option. Examples of the "electronic device" include video cameras, portable telephones, IC recorders, and so forth.

(F) In the above embodiment, whether the door 12 was open or closed was detected by the open/closed detector switch 150, but the present invention is not limited to this. When the air pressure measured by the air pressure gauge 92a first rises from a steady state air pressure value (=atmospheric pressure) and reaches a maximum value and then drops back down to the steady state air pressure value, it may be determined that a watertight structure is not being maintained if the time between reaching a maximum value and the return to a steady state air pressure value is no more than a specific length of time. More specifically, when watertightness testing mode is selected by the user through the manipulation unit 40, the watertightness detector 115 begins sampling with the air pressure sensor 92a. A display is made on the liquid crystal monitor 60 to close the door 12 (after first opening the door 12 if the door 12 was closed), after when the system goes into standby mode. If the watertightness detector 115 detects a maximum value by monitoring the change in the air pressure value, that point in time is determined to be the instant when the door was closed, and the counter is started. In detecting the maximum value, for example, if after the start of sampling, a rise begins from a steady state (that is, atmospheric pressure) in which the air pressure value is held constant, and then a decrease begins, the maximum air pressure value within that range can be termed the maximum value. The processing after this is the same as that starting with step S103 in FIG. 10.

(G) In the above embodiment, the watertightness detector 115 compared the air pressure values acquired a certain number of times as in steps S103 and S104, and if the change fell within a specific range that could be considered to be substantially no change, then the air pressure inside the housing and the air pressure outside were considered to be equal, but the present invention is not limited to this. For instance, the air pressure value (that is, atmospheric pressure) acquired from the air pressure sensor 92a in a state in which the door 12 is open (when the open/closed detector switch 150 is OFF) is stored ahead of time, and if the air pressure value from the air pressure sensor 92a is equal to atmospheric pressure (or if the difference between the air pressure value and the atmospheric pressure is equal to or lower than a specific value) after the door 12 has been closed (after the open/closed detector switch 150 has changed from OFF to ON), the flow may proceed to step S105.

(H) In the above embodiment, the watertightness detector 115 measured time by means of a counter value, but the present invention is not limited to this. The digital camera 1 may be equipped with a clock, so that the watertightness detector 115 acquires and stores the start time in step S102, in step S105 the difference between the current time and the start time is acquired as the elapsed time, and if the elapsed time is at least a specific value, it is determined that a watertight state is being maintained.

(I) In the above embodiment, the watertightness detector 115 displayed the determination result on the liquid crystal monitor 60 as the method for notifying the user of the result of determining watertightness, but the present invention is not limited to this. For example, in step S106 the watertightness detector 115 may notify the user of whether or not a watertight state is being maintained by reproducing a sound from a speaker or the like. In this case, no sound is reproduced if the status is normal, and a certain sound may be reproduced only if there is a problem (if a watertight state is not being maintained).

Thus, the present invention of course includes various embodiments and the like that are not discussed herein. Therefore, the technological scope of the present invention is not limited to just the specific inventions pertaining to the appropriate claims from the descriptions given above.

General interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a electronic device and an imaging device. Accordingly, these terms, as utilized to describe the present invention should be interpreted relative to a electronic device and an imaging device.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electronic device comprising:
   a housing defining an opening and including an air vent;
   a waterproof air-permeable membrane arranged to block off the air vent;
   a door shiftably coupled to the housing and movable between a first position that uncovers the opening and a second position that covers the opening, the door and the housing forming a watertight structure when the door is in the second position;
   an air pressure gauge disposed inside the watertight structure; and
   a watertightness detector configured to determine whether the housing and the door have maintained a watertight state based on changes in the air pressure inside the watertight structure when the door moves from the first position to the second position, the changes in the air pressure being measured by the air pressure gauge.

2. An electronic device comprising:
   a housing defining an opening and including an air vent;
   a waterproof air-permeable membrane arranged to block off the air vent;
   a door shiftably coupled to the housing and movable between a first position that uncovers the opening and a second position that covers the opening, the door and the housing forming a watertight structure when the door is in the second position;
   an air pressure gauge disposed inside the watertight structure;
   a watertightness detector configured to determine whether the housing and the door have maintained a watertight state based on changes in the air pressure inside the watertight structure when the door moves from the first position to the second position, the changes in the air pressure being measured by the air pressure gauge;

a detecting device configured to detect whether the door is in the first position or in the second position, and wherein the watertightness detector is configured to determine that the watertight state is not maintained when the amount of change in the air pressure, as measured by the air pressure gauge within a specific time period, drops below a specific value after the detection device has detected that the door moved from the first position to the second position.

3. An electronic device comprising:
a housing defining an opening and including an air vent;
a waterproof air-permeable membrane arranged to block off the air vent;
a door shiftably coupled to the housing and movable between a first position that uncovers the opening and a second position that covers the opening, the door and the housing forming a watertight structure when the door is in the second position;
an air pressure gauge disposed inside the watertight structure;
a watertightness detector configured to determine whether the housing and the door have maintained a watertight state based on changes in the air pressure inside the watertight structure when the door moves from the first position to the second position, the changes in the air pressure being measured by the air pressure gauge;
when the air pressure inside the watertight structure first rises from a steady state air pressure value to a maximum value and then drops back down to the steady state air pressure value, the watertightness detector is configured to determine whether a watertight state is maintained if the time between reaching the maximum value and returning to the steady state air pressure value is less than or equal to a specific length of time.

4. The electronic device of claim 1, wherein:
the housing is configured to deform under water pressure.

5. The electronic device of claim 4, wherein:
the amount of deformation increases in proportion to the water depth.

6. The electronic device of claim 1, wherein:
the watertightness detector further comprises an air pressure detector that interprets a signal from an air pressure sensor.

7. The electronic device of claim 6, wherein:
the air pressure detector is disposed inside of the housing.

8. The electronic device of claim 1, wherein:
the watertightness detector is further configured to determine whether the housing is in a watertight state after the door has transitioned from the first position to the second position.

9. The electronic device of claim 6, wherein:
the watertightness detector is further configured to determine that a watertight state is not being maintained when the air pressure sensor measures a drop in air pressure inside of the housing below a predetermined value within a predetermined period of time, the predetermined period of time beginning when the detecting device detects that the door has transitioned from the first position to the second position.

10. The electronic device of claim 1, further comprising:
a monitor configured to display a warning that the housing is not in a watertight state.

11. The electronic device of claim 2, wherein:
the housing is configured to deform under water pressure.

12. The electronic device of claim 11, wherein:
the amount of deformation increases in proportion to the water depth.

13. The electronic device of claim 2, wherein:
the watertightness detector further comprises an air pressure detector that interprets the signal from an air pressure sensor.

14. The electronic device of claim 13, wherein:
the air pressure detector is disposed inside of the housing.

15. The electronic device of claim 2, wherein:
the watertightness detector is further configured to determine whether the housing is in a watertight state after the door has transitioned from the first position to the second position.

16. The electronic device of claim 13, wherein:
the watertightness detector is further configured to determine that a watertight state is not being maintained when the air pressure sensor measures a drop in air pressure inside of the housing below a predetermined value within a predetermined period of time, the predetermined period of time beginning when the detecting device detects that the door has transitioned from the first position to the second position.

17. The electronic device of claim 2, further comprising:
a monitor configured to display a warning that the housing is not in a watertight state.

* * * * *